United States Patent
Pellenc et al.

(10) Patent No.: US 8,230,671 B2
(45) Date of Patent: Jul. 31, 2012

(54) AUTOMATIC BYPASSING DEVICE OF TYING POSTS IN FRUIT-BEARING HEDGES, AND AGRICULTURAL EQUIPMENT MAKING USE THEREOF

(75) Inventors: Roger Pellenc, Pertuis (FR); Jean-Marc Gialis, Cheval Blanc (FR); Christian Soulier, La Tour d'Aigues (FR)

(73) Assignee: Pellenc (Societe Anonyme), Pertuis (FR)

( * ) Notice: Subject to any disclaimer, the term of this patent is extended or adjusted under 35 U.S.C. 154(b) by 0 days.

(21) Appl. No.: 13/218,778

(22) Filed: Aug. 26, 2011

(65) Prior Publication Data

US 2012/0073257 A1 Mar. 29, 2012

(30) Foreign Application Priority Data

Sep. 24, 2010 (FR) .................................. 10 03783

(51) Int. Cl.
*A01D 34/52* (2006.01)
*A01D 34/73* (2006.01)
(52) U.S. Cl. ............................... 56/235; 56/330
(58) Field of Classification Search .................... 56/235, 56/234, 503, 15.5, 17.5, 233, 330; 144/34.1; 47/1.43

See application file for complete search history.

(56) References Cited

U.S. PATENT DOCUMENTS

| | | | | |
|---|---|---|---|---|
| 1,802,358 A * | 4/1931 | Smith | ............................ | 56/10.5 |
| 3,035,675 A * | 5/1962 | Lill | ............................ | 192/56.57 |
| 3,777,463 A * | 12/1973 | Claxton | ............................ | 56/330 |
| 4,543,775 A * | 10/1985 | Horn et al. | ............................ | 56/235 |
| 4,733,525 A * | 3/1988 | Pellenc et al. | ............................ | 56/503 |
| 5,259,177 A * | 11/1993 | Windemuller et al. | ............................ | 56/330 |
| 5,339,612 A * | 8/1994 | Scott | ............................ | 56/330 |
| 5,737,908 A * | 4/1998 | Andelfinger | ............................ | 56/235 |
| 5,791,129 A * | 8/1998 | Pellenc | ............................ | 56/15.1 |
| 6,523,337 B2 * | 2/2003 | Spagnolo | ............................ | 56/234 |
| 7,870,712 B2 * | 1/2011 | Pellenc | ............................ | 56/234 |
| 2006/0162309 A1 | 7/2006 | Schloesser | | |
| 2010/0199623 A1 * | 8/2010 | Akahane | ............................ | 56/11.4 |

FOREIGN PATENT DOCUMENTS

| | | |
|---|---|---|
| EP | 2047740 A1 | 4/2009 |
| FR | 2554675 A1 | 5/1985 |
| FR | 2635251 A1 | 2/1990 |

* cited by examiner

*Primary Examiner* — Arpad Fabian-Kovacs
(74) *Attorney, Agent, or Firm* — Egbert Law Offices PLLC (57) ABSTRACT

An apparatus for automatically bypassing tying posts in fruit-bearing hedges has a working head with a pair of vertical drive shafts, each having stacks of toothed cutting disks mounted thereon. Each of the vertical drive shafts having a an opening wheel thereof. The stacks are movable between a position in which the cutting disks mesh with each other and a position in which the stacks of the cutting disks are spaced away from each other. The opening wheels are connected by speed reducers to the shaft such that the open wheels rotate at a speed less than the cutting disks.

11 Claims, 6 Drawing Sheets

AUTOMATIC BYPASSING DEVICE OF TYING POSTS IN FRUIT-BEARING HEDGES, AND AGRICULTURAL EQUIPMENT MAKING USE THEREOF

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention concerns an automatic bypassing device for tying posts or of stakes in fruit-bearing hedges. It also deals with agricultural machines equipped with such a device.

More precisely, the invention concerns an automatic bypassing device for tying posts for agricultural machines featuring a working head shaped for straddling a fruit-bearing hedge growing on staking posts or on tying wires, such as a row of vine stock, this tying including at least one or generally several superposed and spaced wires being supported from place to place by posts made of a rigid and solid material such as wood, metal (galvanized wire, steel, aluminum-zinc alloy, etc.), concrete, composite materials, etc.

It applies more specifically to machines for the cutting and trimming of fruit-bearing hedges.

The description below deals therefore more specifically with this very interesting application of the device of the invention to machines fitted and used for trimming vine stock, but it is emphasized that the reference to a trimming machine in the course of this disclosure does not have any limiting character whatsoever.

2. Description of Related Art Including Information Disclosed Under 37 CFR 1.97 and 37 CFR 1.98

As is generally known, the purpose of mechanical trimming of the vine stock is to simplify the ulterior work of the cutter by eliminating as much wood as possible prior to the manual cutting work.

During this preparatory operation, the wooden parts or canes, the tendrils of which are attached to the tying wires, are cut into pieces and removed. The great difficulty of this work lies in ensuring the bypass of the posts which constitute obstacles to the forward movement of the cutting parts of the working head of the machine, the constraint being that the action of the latter must not be destructive with respect to the posts and the tying wires, or to its own cutting elements.

The majority of currently used trimming machines utilize rotating cutting systems.

The working head of these machines comprises two stacks of rotating cutting parts that are spaced and mounted on vertical drive shafts. These stacks which are offset in the vertical direction are able to occupy two positions, namely: a working position with the tools brought closer together, where the edges of the rotating cutting elements of the two stacks intersect; and an opened position permitting the bypassing of the tying stakes, where the stacks of rotating tools find themselves separated by a vertical space.

Several devices have been proposed for the automatic opening of the working head as they pass the posts.

According to document EP-0 147344, this automatic opening is obtained by the shaping of the cutting tools stacked around the vertical drive shafts. These cutting tools comprise a rotating circular cage which is provided, on its periphery, with notches that are separated by teeth and in this cage are housed fixed cutting blades, said cage and said blades being fitted in a complementary fashion and linked together, to constitute a system of blade and counter-blade producing a shearing cut.

The turning cages of the cutting tool stacks are driven in rotation at a tangential speed that is essentially equal to the linear forward speed of the carrier vehicle on which the working tool of the machine is mounted, so that when the stacks of tools in the closer position encounter a tying post, the latter does not sustain any shock because of the fact that said stacks roll over the post without damaging it and without any risk of deterioration of the cutting tools.

The other particularly advantageous results obtained because of the trimming machine described in document EP-0 147 344 are shown in said document. However, this machine which has been enjoying a great success is relatively expensive.

That is why it has been offered to reduce this cost by replacing one of the stacks of cutting tools of the working head with a stack of feeder disks (see for example FR-2 635 252), but the results obtained by such a hybrid arrangement are clearly less satisfying.

So there are trimmers available on the market that feature a working head or cutting head consisting of more rustic cutting tools whereby it is possible to offer them for sale at more attractive prices, meeting the wishes of certain users. The cutting system of these machines comprises two stacks of fracturing elements constituted by steel disks that are notched on their periphery so as to form alternating teeth and recesses.

To improve the quality of wood cuts, the peripheral teeth of the cutting disks can be sharpened. The cutting tools or disks thus produced can be stacked on two vertical shafts at a regular distance from each other in the order of a few centimeters, 10 cm for instance.

The two vertical shafts are positioned on each side of the tying wires and are set so that the right and the left stacking disks intersect each other a few centimeters, 5 cm for instance, apart in the horizontal plane, in the closer working position, and are positioned a few millimeters from each other, 10 mm for instance in the vertical plane.

The crossing of the right stacking disks with the left stacking disks ensure the cutting off and the fragmenting of the wood of the fruit-bearing hedge.

The speed on the periphery of the rotating cutting disks must be twice the moving speed of the machine, so as to facilitate the cutting of the wood and to obtain a good cleaning of the tying wires.

This rotation speed of the disks can be adjusted by means of a flow divider that the hydraulic rotational drive system of said cutting disks is equipped with.

As the two stacks of toothed cutting disks are being kept under pressure against the fruit-bearing hedge, and in order not to be distanced from each other under the cutting force of the vegetation, they must be spread apart by the operator at the passage of each tying post. As the disks rotate at a peripheral speed above the forward speed of the machine, if the operator does not move the stacks apart, the tying posts could be damaged if they are made of wood, or cause the deterioration of the disks when said posts are made of steel or concrete. Likewise, at the entrance and exit of the row of vine stock forming the fruit hedge, the stacks of cutting disks are spread apart in order not to cut the abutment wires.

The tying wires must be properly tensioned so they won't be caught or cut off during the movement of the machine in the row.

Most of the current systems of the type described are unable to provide an automatic opening of the cutting head when passing the posts.

Certain manufacturers propose solving this problem by using opening wheels which are mounted in lieu of one of the disks of each stack, one on the drive shaft of the right stack and one on the drive shaft of the left stack.

These opening wheels have a diameter slightly larger than the diameter of the toothed cutting disks, for instance a diameter that is 2 cm larger than the diameter of the cutting disks, so that when the cutting stacks pass the tying posts, the latter will be in contact only with the opening wheels and not with the cutting disks.

These wheels are, in certain cases, driven in rotation directly by the same drive shaft as the stacks of cutting disks (see for example US 2006/0162309).

Since the peripheral speed of the opening wheels is above the forward speed of the machine so as to avoid unsatisfactory cutting of the woods, the main disadvantage of such a system is that the posts are being pulled backwards and possibly twisted or broken when the wheels come into contact with the posts.

In certain cases, the opening wheels are mounted through the intermediary of a bearing, so that they run idle. In this case, since these opening wheels are not driven in rotation, the main disadvantage of such an arrangement is that the tying posts are being pushed forward, and possibly become twisted or broken when the wheels come in contact with said posts.

Another known possibility is to mount the opening wheels through the intermediary of a bearing on the drive shafts and to drive them in rotation by a driving element that is exterior to the stacks, for example by a transmission belt or chain type. The major disadvantages of such a system are its complexity, its space requirements and the relatively high cost.

One aim of the present invention is to remedy the aforementioned disadvantages of the trimming machines of the kind featuring a working head comprising two vertical drive shafts on which are mounted two stacks of toothed cutting disks and an opening wheel.

BRIEF SUMMARY OF THE INVENTION

According to the invention this objective has been achieved by mounting this rotating opening wheel on the vertical drive shaft of each stack of toothed cutting disks, by means of a speed reducer coupled to said shaft.

Due to this arrangement, when the tying posts are passed, the opening wheels wrap themselves around the latter without pushing or pulling them and they automatically push the stacks of toothed cutting disks out of the way.

According to a preferred implementation, the ratio of speed between the rotation of the drive shafts of the toothed cutting disks and the rotation of the opening wheels is 1:2, so that if the cutting disks rotate, for example, at 200 RPM, the opening wheels turn at 100 RPM.

According to another characteristic arrangement, the speed reducers are constituted by reducers with a planetary gear train.

According to another characteristic arrangement, one of the faces of the opening wheel of each stack of toothed disks is fitted so as to constitute a counter-blade mounted opposite one of the toothed cutting disks of the other stack of disks.

A collaborative effort between the opening wheel and the disk of the opposite stack is obtained so that the trained vines can be trimmed over the entire height of the stacks.

BRIEF DESCRIPTION OF THE SEVERAL VIEWS OF THE DRAWINGS

The above aims, characteristics and advantages and still more, will become clearer from the following description and the attached drawings in which.

Reference to said drawings is made to describe an interesting, although by no means limiting example of production of the opening device of the cutting head according to the invention.

DETAILED DESCRIPTION OF THE INVENTION

It is emphasized in the present description and in the Claims, that the term "fruit-bearing hedge" designates a row or line of fruit-bearing bushes which may be of various species that are cultivated on tying wires or on stakes, such as rows of vine stock.

Figure 1:
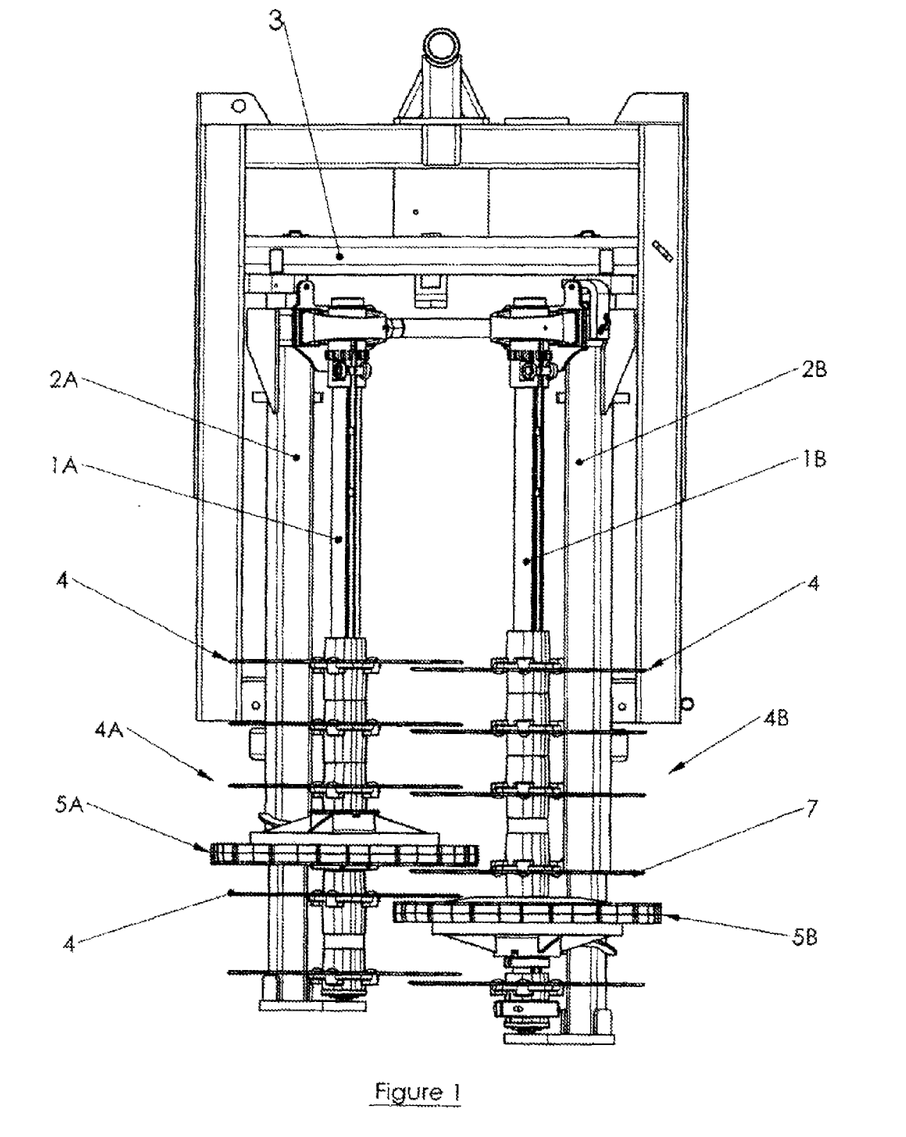
FIG. 1 is a front view illustrating an example of possible placement of the opening wheels in the stacks of toothed disks or saw-teeth of a cutting head of a trimming machine.
Figure 2:
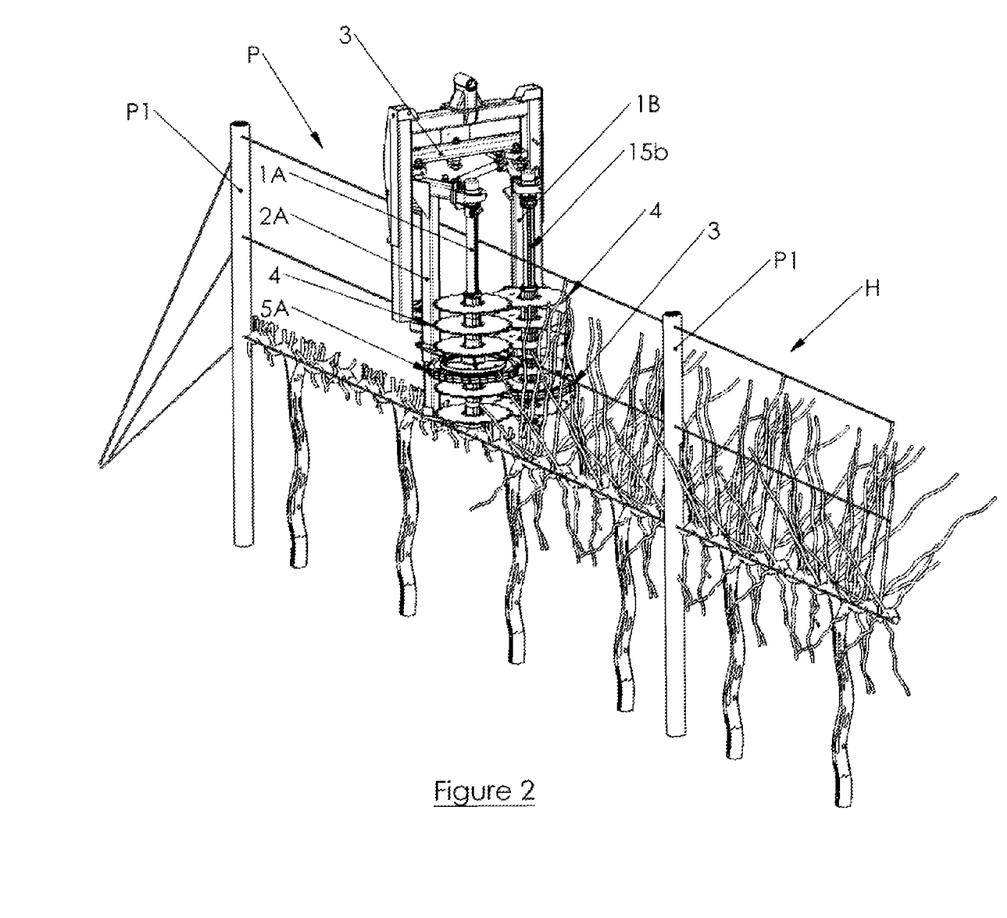
FIG. 2 is an overall perspective view showing the positioning of the cutting head in a row of vine stock.

The cutting head of the trimming machine shown in FIG. 1 features two vertical rotating drive shafts 1A and 1B. Each of these shafts is supported by a pivoting vertical cradle 2A, 2B and driven in rotation by a motor which may comprise a hydraulic motor coupled to the upper end of said drive shafts.

This pivoting vertical cradle is itself suspended, in pendulum fashion known as such, on a support arm connected in an articulated manner to chassis 3 of the cutting head.

On each of the vertical drive shafts 1A, 1B, are mounted toothed cutting disks or circular saws 4, stacked on said shafts, at preferably even distance, on top of each other. In a manner known as such and as indicated previously, the stacks 4A, 4B are offset in vertical direction, so that the toothed cutting disks can mesh together when said stacks are brought together or in closed position of the cutting head. More precisely, the toothed cutting disks of the right stack 4A and the toothed cutting disks of the left stack 4B intersect in the horizontal plane, over a distance of several centimeters, for example over a distance of 5 cm.

At least one rotating opening wheel 5A, 5B is mounted around each vertical shaft 1A, 1B, these opening wheels being driven in rotation by said shafts.

The pivoting motion in the reverse direction of the supporting cradles 2A, 2B results in: either the bringing together of the cutting stacks in working position; or the distancing of the latter in the position to bypass the posts P1 of the tying wires P of the fruit-bearing hedge H.

According to a characteristic disposition of the invention, each opening wheel is mounted on its drive shaft 1A, 1B, through the intermediary of a speed reducer coupled in rotation to said shaft.

According to another advantageous characteristic disposition, these speed reducers are constituted by planetary gear train reducers.

Each of these planetary gear train reducers 20 includes (FIGS. 4 and 5):
- an input sun-gear 6 driven in rotation by the shaft 1A or 1B together with which it rotates by means of a coupling 1a-6a;
- four bearings mounted on the sun-gear 6, two bearings 7a on the upper part and two bearings 7b on the lower part of said sun-gear 6;
- a flange 8 mounted on the two lower bearings 7b and to which are attached, on the one hand, a second output sun-gear 9, by means of screws 10, and, on the other hand, a stopping tail 11 by means of screws 12, this stopping tail 11 taking hold on the tube 13 of polygonal (for example four-sided) section of the pivoting vertical cradle 2A or 2B of the cutting head so as to stop the rotation of the sun-gear 9;
- a star carrier 15 mounted on the two upper bearings 7a; and
- three planet gears 16 provided with a plain bearing 17 and mounted on the star carrier 15.

Figure 4:
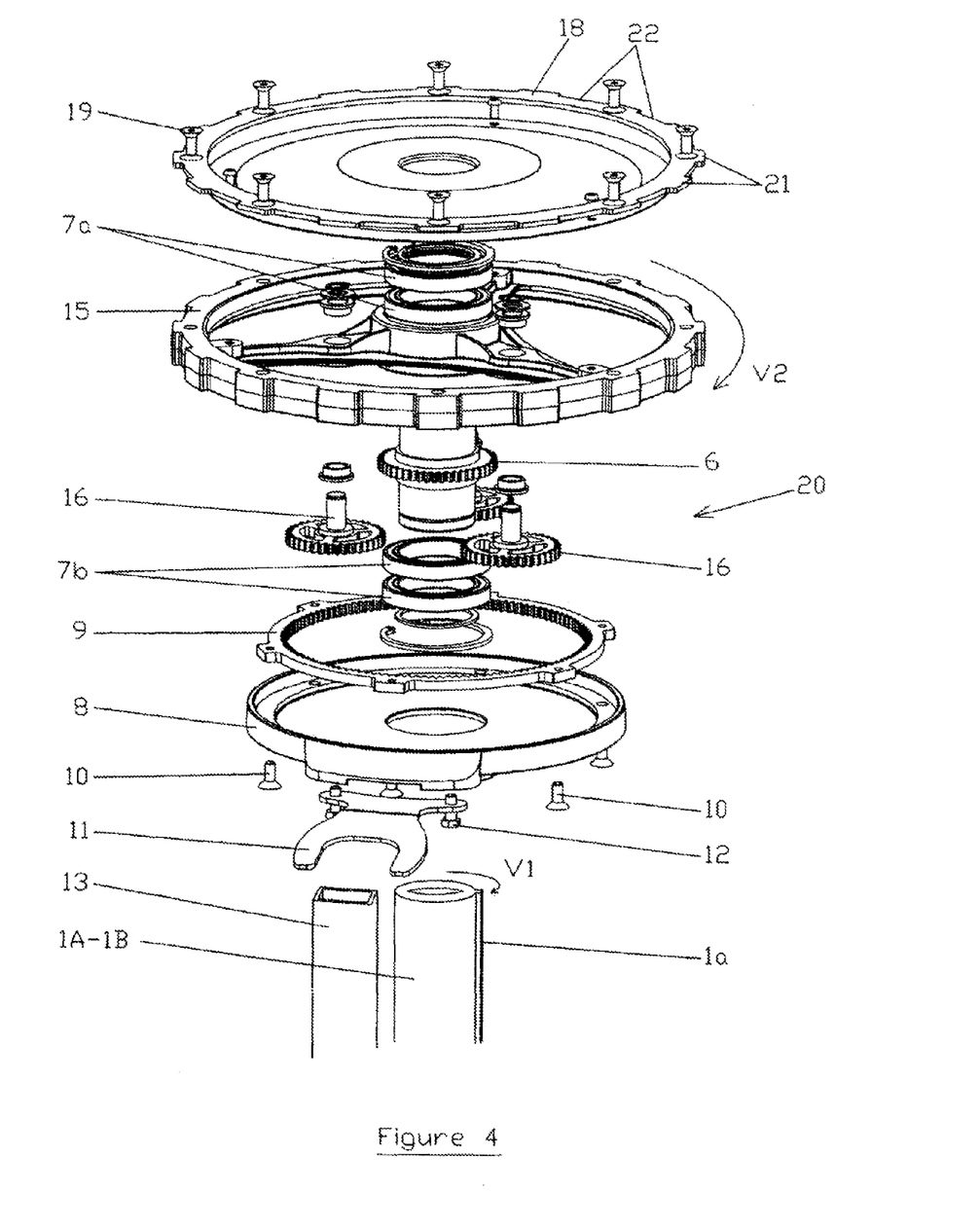
FIG. 4 is an exploded perspective view showing an example of mounting an opening wheel on a drive shaft.
Figure 5:
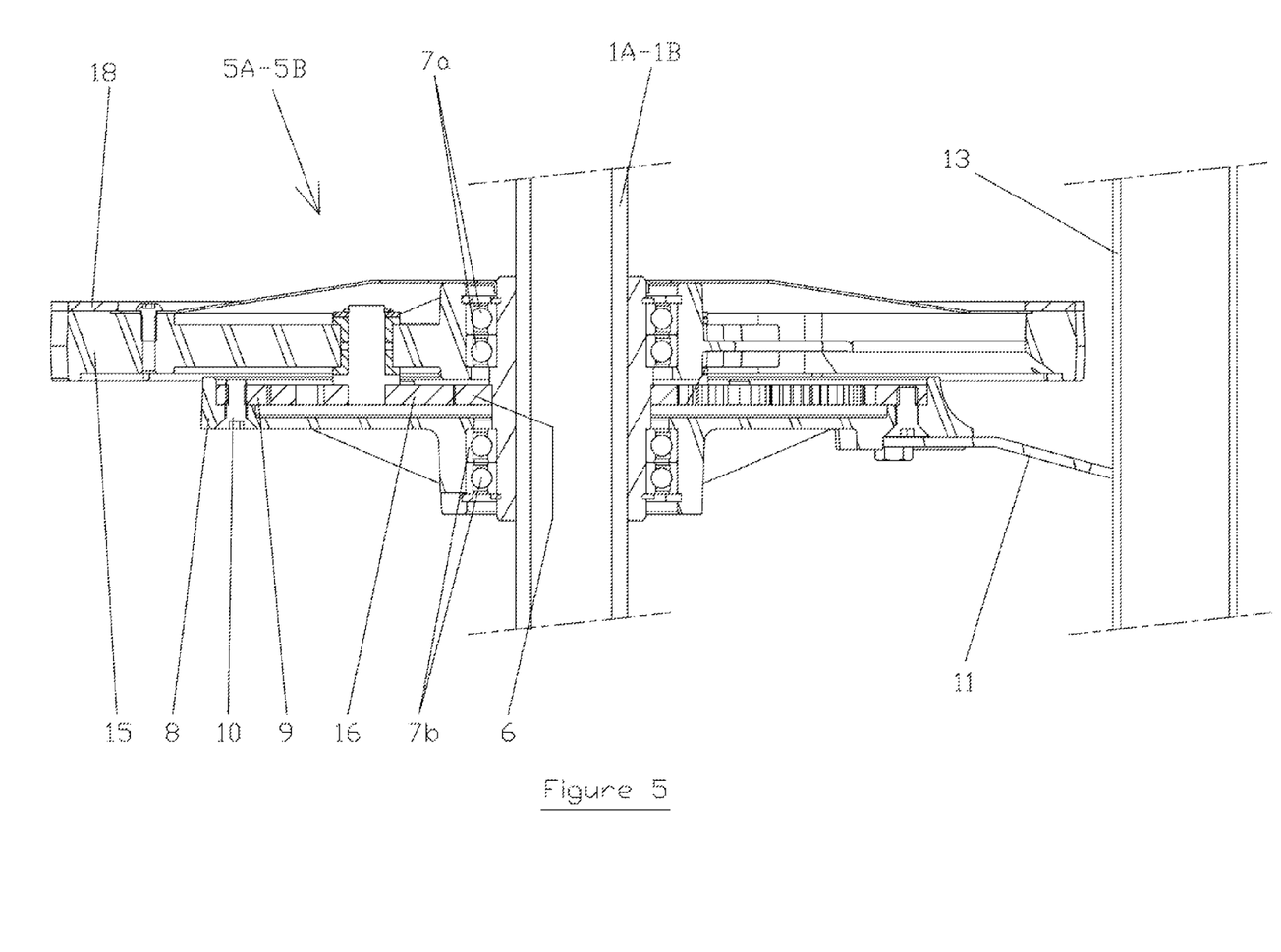
FIG. 5 is an axial cross-section of this example of mounting.
Figure 6:
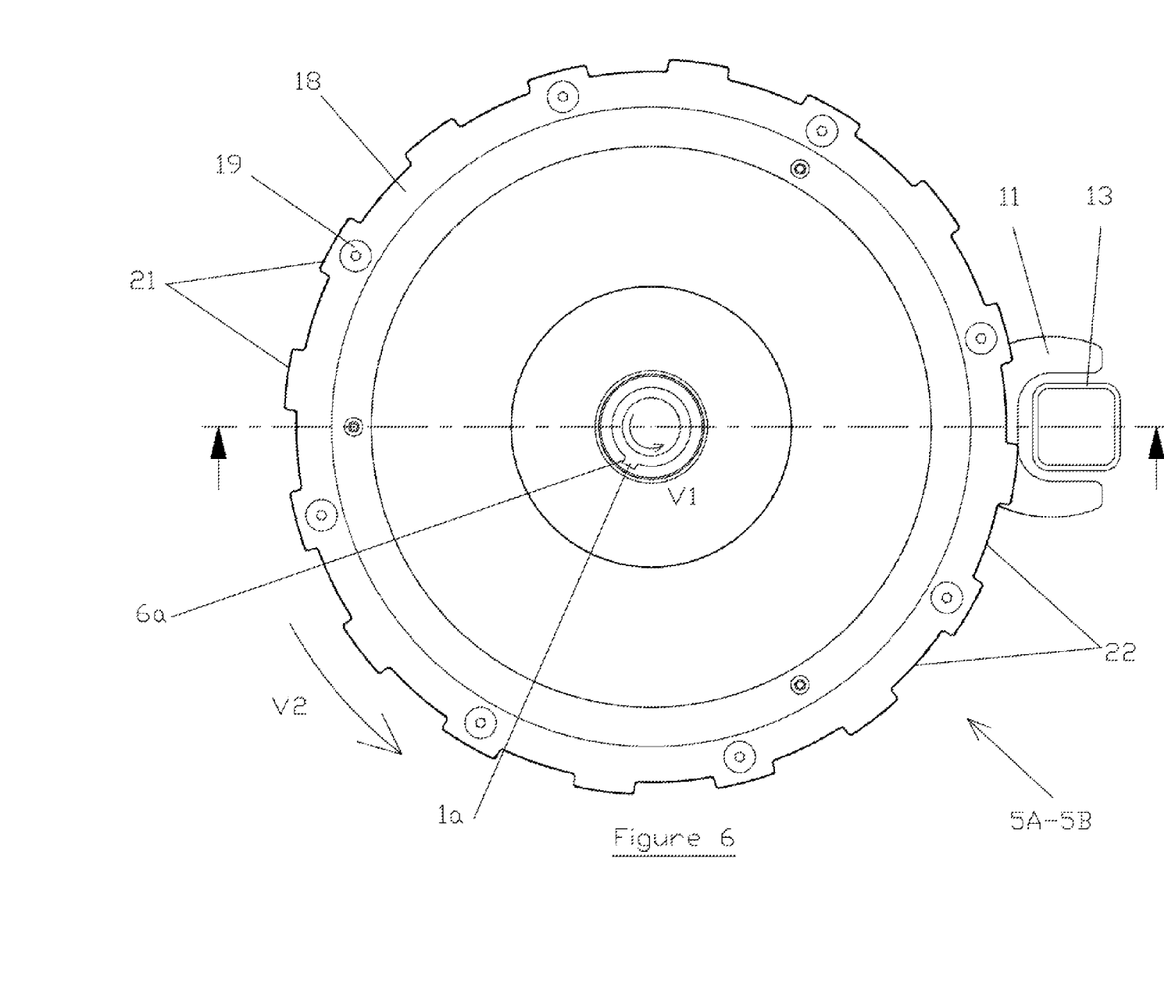
FIG. 6 is a top view of FIG. 5.

The planet gears are engaged, on the one hand, with the teeth of sun gear 6 and, on the other hand, with the teeth of sun gear 9 comprising a circular crown with teeth on the inside.

According to a preferred method of production, the ratio of reduction of the speed reducer and, in particular, the ratio of reduction of the planetary gear train described above, is in the order of 1:2. This ratio of reduction makes it possible to obtain a rotation speed between the sun gear 6 and the star carrier 15 such as V2=V1:2, in which:
V1=rotation speed of the drive shafts 1A, 1B,
V2=rotation speed of the opening wheels 5A, 5B.

The star carrier 15 of the opening wheels 5A, 5B, which has a diameter greater than the diameter of the toothed cutting disks 4, makes contact with and wraps itself around the posts P1 of the tying wires P, as the trimming machine advances on the fruit-bearing hedge H with a rotation speed V2 which will have been preset by the operator to correspond essentially to the forward speed so as not to exert any pushing or pulling force on said posts.

It is clear that according to the arrangement of the planetary gear train reducer illustrated in FIGS. 4 and 5, the opening wheels 5A and 5B are properly constituted by the periphery of the rotating star carrier 15.

The cutting stacks 4A, 4B turn at a rotation speed V1 twice as great as the rotation speed V2 of the opening wheels and permit high-quality trimming and fracturing of the woods and canes, as well as a good cleaning of the tying wires of the fruit-bearing hedge. For example, the cutting disks turn at 200 RPM, whereas the opening wheels turn at 100 RPM.

According to another advantageous characteristic disposition of the invention, one of the faces of the opening wheel 5A, 5B of each stack 4A, 4B is fitted to constitute a counter-blade which, in the active close position of said stacks finds itself facing one of the opposite surfaces of the peripheral zone of one of the cutting disks 4 of the opposite stack 4B, 4A.

In this way, one obtains a cooperating action between the opening wheel and the cutting disk positioned opposite with a slight offset in the vertical direction, and so the fruit-bearing hedge can be trimmed over the entire height of the stacks 4A and 4B.

According to a method of production illustrated in FIGS. 4 and 5, a circular counter-blade is fastened, by means of screws 19, on the star carrier 15 of each opening wheel.

The counter-blade 18 is equipped, peripherally and alternatingly, with teeth 21 and notches 22.

The periphery of each opening wheel 5A, 5B which may be advantageously constituted by the star carrier 15 of the reducer of the planetary gear train 20, presents a shape that is identical to that of the counter-blade 18.

A small gap has been made between the counter-blade 18 of the opening wheels 5A, 5B, and the toothed cutting disk 4 placed opposite with a slight vertical offset, this gap being, for example, in the order of 10 mm.

Preferably, the counter-blade is positioned on the upper face of the planetary gear train reducer constituted by the star carrier 15 and it is placed opposite the lower face of the disk 4 of the opposite stack with which the counter-blade is associated.

FIGS. 3A to 3E illustrate the movement of the cutting head of a trimming machine on a row of vine stock.

Figure 3A:
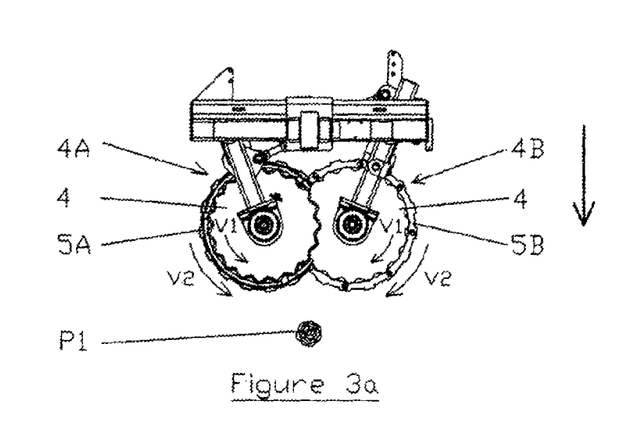
FIGS. 3A, 3B, 3C, 3D, 3E are top views showing the movements of the stacks of the cutting head when passing a post.

On FIG. 3A, the cutting head approaches a post P1 of the tying wires. The cutting disks 4 of the stacks 4A, 4B which mesh with each other, turn at a speed V1, whereas the opening wheels 5A, 5B, turn in the same direction, at a speed V2 which is half of V1.

Figure 3B:
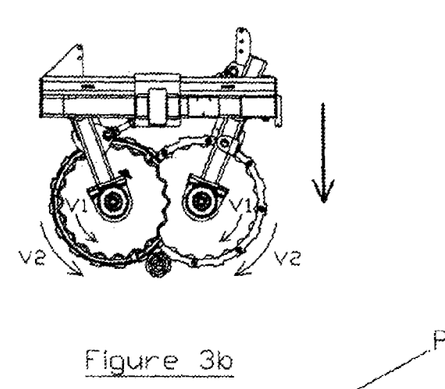

FIG. 3B shows how the opening wheels come into contact with the post P1.

Figure 3C:
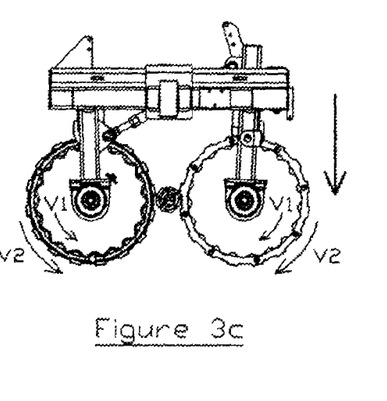

On FIG. 3C, the opening wheels roll over the post 1, which results in the cutting disks 4 of the stacks 4A, 4B moving away from the post P1.

Figure 3D:
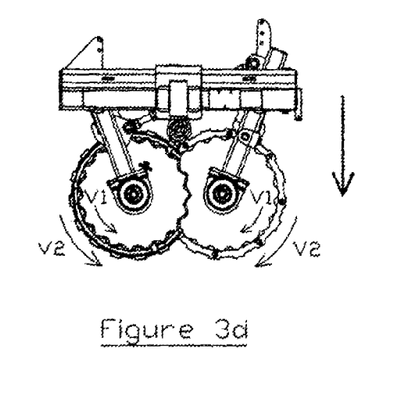

On FIG. 3D, the post P1 has been bypassed and the stacks 4A, 4B find themselves closer to each other under the action of the return mechanism (not shown) known as such. In this position the stacks mesh again with each other.

Figure 3E:
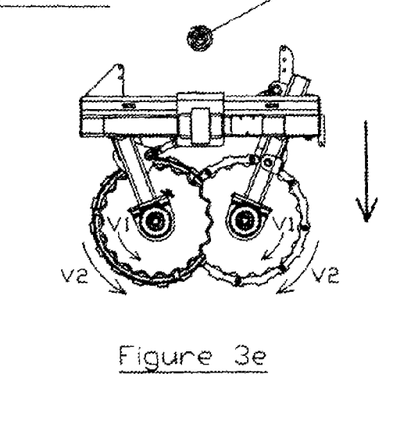

FIG. 3E shows the cutting head moving away from the bypassed post P1.

We claim:

1. An apparatus for automatic bypassing of tying posts of fruit-bearing hedges, the apparatus comprising:
a first vertical drive shaft having a first plurality of toothed cutting disks affixed thereto, said first plurality of toothed cutting disks arranged in vertically spaced relation to each other;
a second vertical drive shaft having a second plurality of toothed cutting disks affixed thereto, said second plurality of toothed cutting disks arranged in vertically spaced relation to each other, said first and second vertical drive shafts being rotatable;
a first opening wheel mounted by a first speed reducer to said first vertical drive shaft such that said first opening wheel rotates with a speed of rotation less than a speed of rotation of said first plurality of toothed cutting disks;
a second opening wheel mounted to by a first speed reducer to said second vertical drive shaft such that said second opening wheel rotates with a speed of rotation less than a speed of rotation of said second plurality of toothed cutting disks, said first and second vertical drive shafts being movable between a first position in which the toothed cutting disks generally mesh with each other and a second position in which the toothed cutting disks are spaced away from each other.

2. The apparatus of claim 1, each of said first and second speed reducers being a planetary gear train reducer.

3. The apparatus of claim 2, said planetary gear train reducer comprising:
   a first sun gear driven by the vertical drive shaft;
   four bearings mounted on said sun gear in which two of the four bearings are mounted on a top of said sun gear and in which another two of the said four bearings are mounted on a bottom of said sun gear;
   a flange mounted in said another two of said four bearings;
   a second sun gear mounted by screws to said flange;
   a stopping tail mounted by screws to said flange;
   a star carrier mounted to said two of said four bearings; and
   three planet gears having a planar bearing, said three planet gears mounted to said star carrier.

4. The apparatus of claim 1, the speed reducer having a reduction ratio of 1:2.

5. The apparatus of claim 1, the opening wheel having a counter-blade fitted to a face thereof.

6. The apparatus of claim 4, further comprising:
   a circular counter-blade attached to said star carrier.

7. The apparatus of claim 6, said circular counter-blade being offset from the toothed disk by a distance of approximately 10 millimeters.

8. The apparatus of claim 6, said circular counter-blade having teeth and recesses arranged alternately around a periphery thereof.

9. The apparatus of claim 6, the opening wheel having a shape identical to a shape of said circular counter-blade.

10. The apparatus of claim 2, further comprising:
    a circular counter-blade positioned on an upper face of said planetary gear train reducer, said circular counter-blade positioned opposite to a lower face of the toothed cutting disk.

11. An agricultural machine having an apparatus for automatic bypassing of tying posts of fruit-bearing hedges according to claim 1.

* * * * *